United States Patent
Gaw

(10) Patent No.: US 9,610,618 B2
(45) Date of Patent: Apr. 4, 2017

(54) DEVICE AND METHOD FOR ELECTROSTATICALLY CLEANING A SURFACE

(71) Applicant: The Boeing Company, Huntington Beach, CA (US)

(72) Inventor: Kevin O'Brien Gaw, Tukwila, WA (US)

(73) Assignee: THE BOEING COMPANY, Chicago, IL (US)

(*) Notice: Subject to any disclaimer, the term of this patent is extended or adjusted under 35 U.S.C. 154(b) by 178 days.

(21) Appl. No.: 14/570,870

(22) Filed: Dec. 15, 2014

(65) Prior Publication Data

US 2016/0167092 A1  Jun. 16, 2016

(51) Int. Cl.
*B08B 6/00* (2006.01)
*B64C 3/56* (2006.01)
*B08B 1/04* (2006.01)

(52) U.S. Cl.
CPC ............... *B08B 6/00* (2013.01); *B08B 1/04* (2013.01); *B64C 3/56* (2013.01)

(58) Field of Classification Search
CPC .. A46B 13/02; A46B 9/02; B08B 1/00; B08B 6/00
See application file for complete search history.

(56) References Cited

U.S. PATENT DOCUMENTS

| | | | |
|---|---|---|---|
| 6,085,061 A * | 7/2000 | Snelling | G03G 21/0035 15/1.51 |
| 6,983,508 B2 * | 1/2006 | Saurer | A46B 13/001 15/104.04 |
| 2012/0152275 A1 * | 6/2012 | Chia | B08B 6/00 134/1 |

* cited by examiner

*Primary Examiner* — Justin Benedik
(74) *Attorney, Agent, or Firm* — Parsons Behle & Latimer

(57) ABSTRACT

A system for electrostatically cleaning surfaces includes an electrostatically chargeable brush, having conductive polymer bristles, moveably disposed adjacent to a solid surface to be cleaned. The system also includes an actuator, configured to linearly move a solid element toward and through sliding contact along the solid surface, the brush being positioned to contact at least one of the solid surface and the solid element prior to the sliding contact, to electrostatically remove dust and the like therefrom.

14 Claims, 9 Drawing Sheets

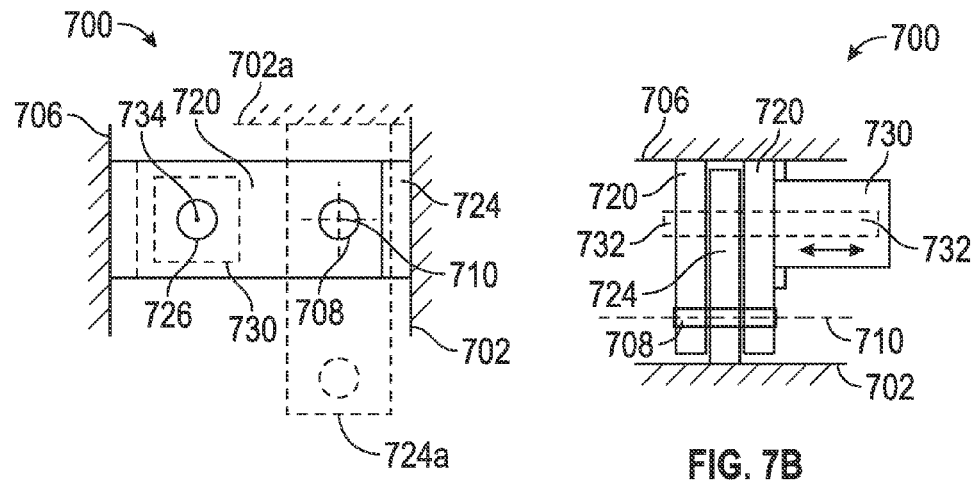
FIG. 7A
FIG. 7B
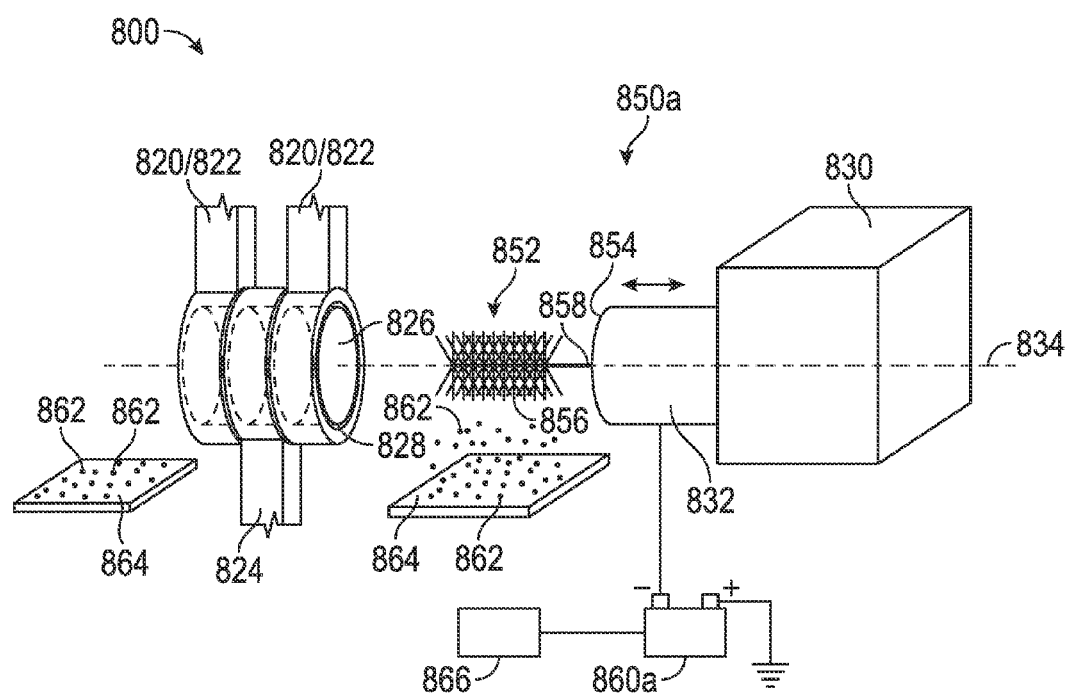
FIG. 8A

DEVICE AND METHOD FOR ELECTROSTATICALLY CLEANING A SURFACE

FIELD OF THE DISCLOSURE

The present disclosure relates generally to devices for electrostatically cleaning surfaces. More particularly, the present disclosure relates to a device and method for electrostatically cleaning surfaces, such as those of a releasable pin lock actuation mechanism.

BACKGROUND

There are a variety of industries and activities in which the careful and controlled mitigation or removal of dust can be very desirable. For example, in the operation of machines or in manufacturing, such as automotive or aircraft manufacturing, the regular or controlled removal of dust from surfaces can be important for the proper fabrication or operation of a part or a machine. As another example, industries that handle or process powders or powdered materials, such as food, minerals or chemicals, often have a need to remove dust from surfaces. Careful, and thorough dust removal and control can be especially important where dust or powdered materials may be hazardous or detrimental to the lifetime of machinery.

Existing devices and methods for dust removal from surfaces present a variety of challenges. For example, chemical or water wipes are often used for dust removal, but these are typically disposable, one-time use items that generate waste, and can have other negative aspects. Brushes are often used for dust removal, but present the potential for redeposition of electrostatically charged dust particles onto the surface, or the charging of uncharged particles by the brush through tribologic charging rendering the brush ineffective. Additionally, dust removal brushes that are known generally cannot change the electrostatic state of the particles that are being brushed.

The present application relates to one or more of the above issues.

SUMMARY

It has been recognized that it would be desirable to have a device and method for electrostatically cleaning surfaces that does not produce significant waste or leave chemical residues.

It has also been recognized that it would be desirable to have a device and method for electrostatically cleaning surfaces that is resistant to redeposition of electrostatically charged dust particles onto a surface, or the charging of uncharged particles by a brush through tribologic charging.

It has also been recognized that it would be desirable to have a device and method for electrostatically cleaning surfaces, the device being self-cleaning.

In accordance with one embodiment thereof, the present application discloses a system for electrostatically cleaning surfaces. The system includes an electrostatically chargeable brush, having conductive polymer bristles, moveably disposed adjacent to a solid surface to be cleaned. The system also includes an actuator, configured to linearly move a solid element toward and through sliding contact along the solid surface, the brush being positioned to contact at least one of the solid surface and the solid element prior to the sliding contact, to electrostatically remove dust and the like therefrom.

In accordance with another embodiment thereof, the present application provides a releasable pin lock mechanism, including at least two adjacent receiving lugs, associated with independently moveable structures, each receiving lug having a receiving lug hole of a common size, the receiving lug holes being aligned along an axis, and a moveable locking pin, aligned along the axis, and having a size substantially equal to the size of the receiving lug holes. The mechanism also includes a pin actuator, configured to selectively axially insert the locking pin into the receiving lug holes and remove the pin therefrom, and an electrostatically chargeable brush, associated with at least one of the locking pin and the receiving lug hole, configured to electrostatically attract dust and the like from at least one of the locking pin and the receiving lug holes.

In accordance with yet another embodiment thereof, the present application provides an aircraft having a folding wing, including an inboard fixed wing portion, and a folding outboard wing tip portion, hingedly connected to the inboard fixed wing portion and moveable between a lowered, locked position, and a raised, unlocked position. The aircraft further includes a releasable pin lock mechanism, configured to fix the outboard wing tip portion in the locked position, including a moveable locking pin and a receiving lug hole, and an electrostatically chargeable brush, associated with the pin lock mechanism. The electrostatically chargeable brush is configured to electrostatically attract dust and the like from at least one of the locking pin and the receiving lug hole.

BRIEF DESCRIPTION OF THE DRAWINGS

FIGS. 7A and 7B are side and top view free body diagrams, respectively, of a generic pin locking mechanism with the pin locking lug holes aligned.

FIG. 8A is a schematic diagram of an embodiment of an electrostatic cleaning system associated with a pin lock mechanism, the pin having an elongate electrically chargeable brush attached at its distal end.

Figure 1:
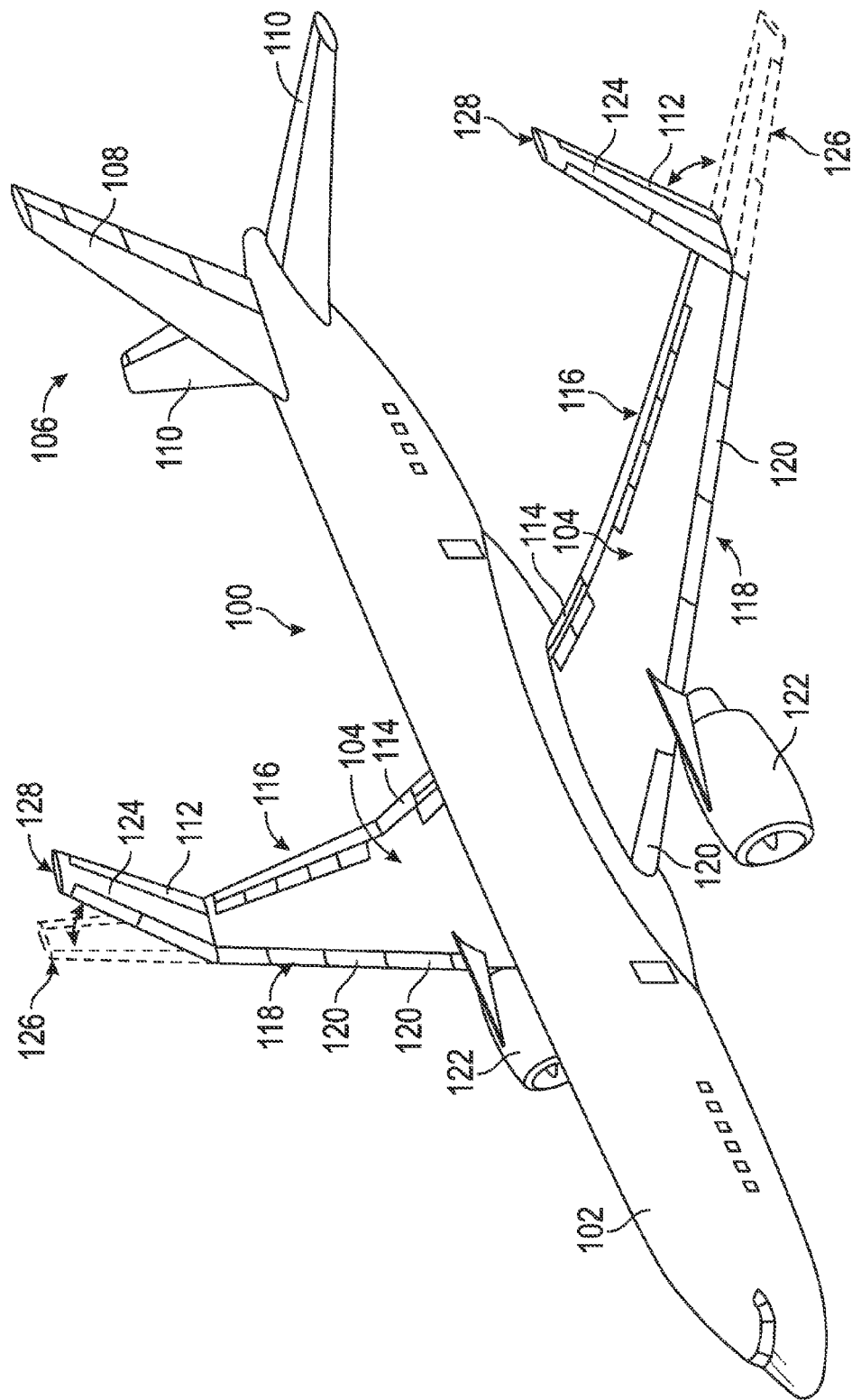
FIG. 1 is a perspective view of a commercial aircraft having folding wing tips.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Disclosed herein is a system and method for electrostatically cleaning surfaces that overcomes some of the challenges of prior dust removal devices and methods. The system and method disclosed herein is shown and described in the context of cleaning the interior surface of a releasable pin lock mechanism for a folding aircraft wing, but it is not limited to this application. Shown in FIG. 1 is a perspective view of a wide body aircraft 100, which includes a fuselage 102, a main wing 104 attached to the fuselage 102, and a tail structure 106 that includes a vertical stabilizer 108 and a horizontal stabilizer or elevator 110. The main wing can include ailerons 112 and wing flaps 114 along its trailing edge 116, and the leading edge 118 of the wing 104 can include moveable slats 120 for increasing lift during takeoff. The aircraft 100 also includes turbofan jet engines 122, in this case mounted to the main wings 104, for providing thrust for flight.

Unlike most conventional commercial aircraft, the aircraft 100 includes folding wing tips 124, which have a lowered position for use during flight, indicated in dashed lines at 126, and a raised position, shown at 128. Folding wings are common in naval aircraft that are designed to operate within the constraints of limited hangar and deck space of aircraft carriers, but have not been widely used for commercial aircraft. In recent years, however, there has been a desire to accommodate larger commercial aircraft using airport facilities, such as aircraft terminals, gates, etc., that were originally designed for smaller aircraft. Advantageously, the raised position of the wing tips 124 of the aircraft 100 can be used when the aircraft is on the ground, such as during taxiing and when at an aircraft gate, allowing larger aircraft with a greater wingspan to use facilities that were designed for aircraft with a smaller wingspan. Wider use of large aircraft without modifying aircraft gates, terminals, and other related facilities is believed to be desired by commercial aircraft operators.

Figure 2:
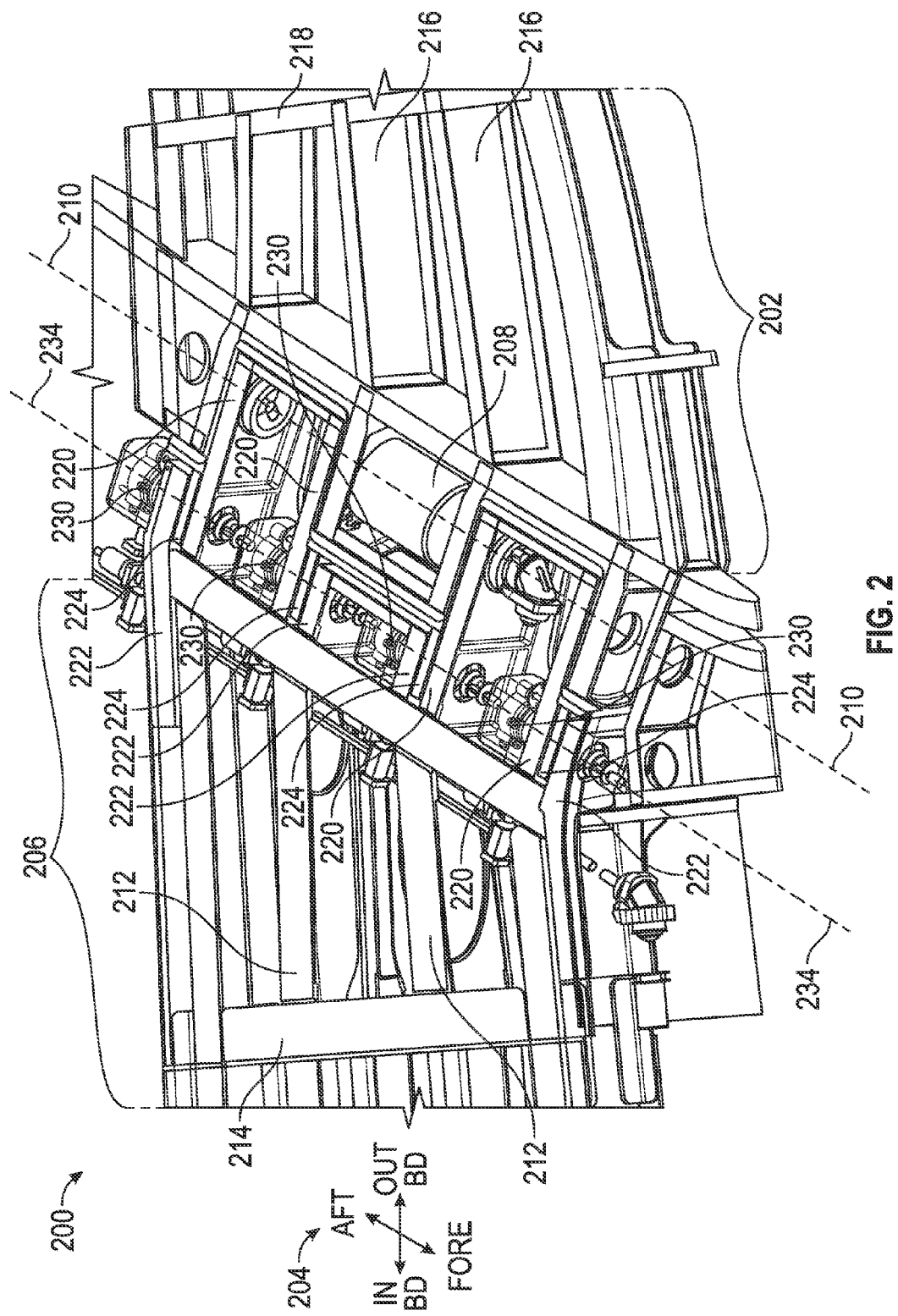
FIG. 2 is an upper perspective view of internal wing structure associated with an embodiment of an internal wing tip locking mechanism for a folding wing tip, showing the wing tip pivoting axis and the pin locking axis.

There are a variety of wing folding and locking mechanisms that have been used for folding wing aircraft. Shown in FIG. 2 is an upper perspective view of a portion of the internal wing structure associated with one embodiment of a folding wing tip pivoting and locking mechanism 200 that can be used in a commercial aircraft, showing the wing tip portion 202 in the down and locked position. For reference, the fore, aft and inboard, outboard directions related to this view are shown at 204. The wing includes a fixed inboard wing portion 206 and a folding outboard wing tip portion 202 attached via a hinge 208 having a pivoting axis 210. It is to be appreciated that the pivoting axis 210 of the hinge 208 lies at an angle relative to the structure of the wing because of the swept angle of the wing. The pivoting axis 210 at this angle allows the wing tip portion 202 to fold upward along an axis 210 that is generally parallel to the fore-aft axis of the aircraft shown at 204, and illustrated in FIG. 1.

The fixed inboard wing portion 206 includes main wing spars 212 that run lengthwise through the wing, and generally transverse ribs 214 that interconnect the spars fore to aft in the wing structure and help provide the airfoil shape of the wing cross-section. The folding outboard wing tip portion 202 also includes wing tip spars 216 that run lengthwise through the folding wing tip portion 202, with generally transverse ribs 218 that interconnect the wing tip spars 216 fore to aft in the wing tip structure 202. A group of main spar extension lugs 220 extend in an outboard direction from the main wing spars 212 to the hinge connection 208. Each main spar extension lug 220 also includes an opposingly paired fixed lug portion 222 that is parallel to the main spar extension lug 220, but does not extend to the hinge connection 208. Similarly a group of wing tip spar extension lugs 224 extend in an inboard direction from the wing tip spars 216 through the hinge connection 208 and to a position adjacent to the main spar extension lugs 220 and their opposing fixed lug portions 222.

Figure 3:
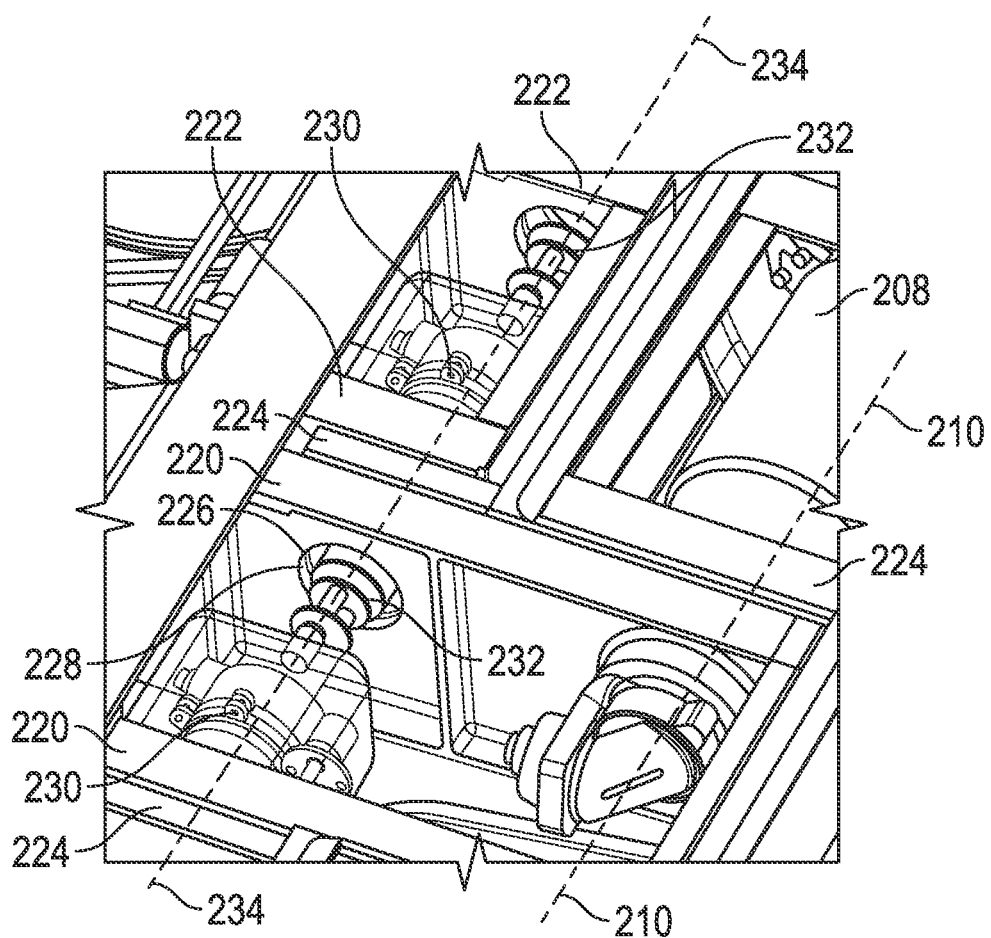
FIG. 3 is a close-up perspective view of a portion of FIG. 2, showing the pin locks and pin actuators of the wing tip locking mechanism.

In the configuration of FIG. 2 the wing tip spar extension lugs 224 are interleaved between the main spar extension lugs 220 and their opposing fixed lug portions 222. A close-up perspective view showing these and other features is provided in FIG. 3. The wing tip spar extension lugs 224, the main spar extension lugs 220 and the opposing fixed lug portions 222 are all parallel to each other, and at a location inboard from the pivoting axis 210. Each of these spar extension lugs 220/224 and opposing fixed lug portions 222 include a pin lock lug hole 226, each of which can include an internal pin bushing 228. A group of pin lock actuators 230 are each fixedly attached to either a main spar extension lug 220 or an opposing fixed lug portion 222 of the inboard fixed wing portion 206, each pin lock actuator 230 including a linearly moveable locking pin 232. When the wing tip 202 is in its lowered position, the pin lock lug holes 226 of each group of the interleaved wing tip spar extension lugs 224, the main spar extension lugs 220 and the opposing fixed lug portions 222 are all aligned along pin locking axis 234. In this position, each of the pin lock actuators 230 can extend the locking pin 232 through the aligned pin lock lug holes 226 so that the pin 232 is received in the lug holes 226 with a sliding fit, to securely lock the wing tip 202 in the lowered position. Advantageously, the configuration shown in FIGS.

2 and 3 contains the wing tip locking mechanism entirely within the envelope of the wing airfoil shape.

Figure 4:
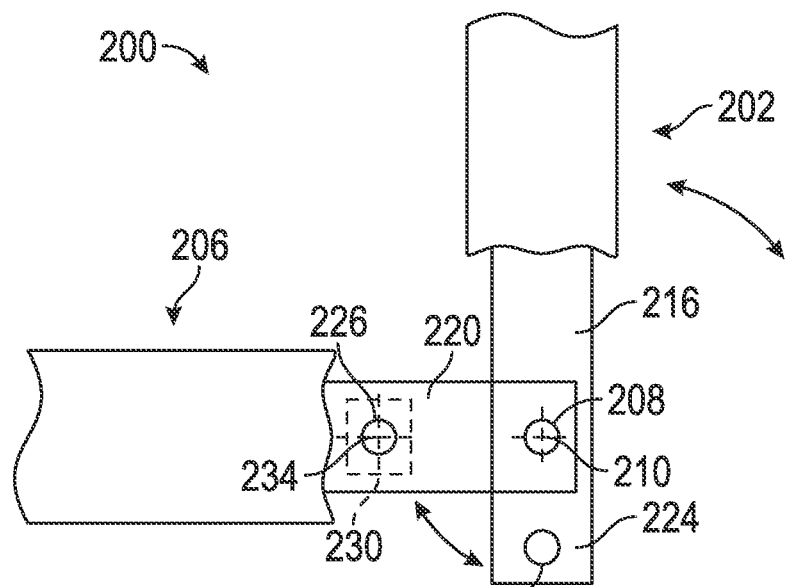
FIG. 4 is a free body diagram of a folding wing tip locking mechanism like that of FIGS. 2 and 3, showing the relationship of the wing pivoting axis and the pin locking lug holes.

When the locking pins 232 are retracted, the wing tip 202 can be raised. Shown in FIG. 4 is a free body diagram of a folding wing tip locking mechanism 200 like that of FIGS. 2 and 3, with the wing tip portion 202 in the raised position. This shows the relationship of the wing pivoting axis 210 and the axis 234 of the pin locking lug holes 226. In this position the pin lock lug holes 226 of the fixed wing portion 206 are not aligned with the pin lock lug holes 226 of the spar extension 224 of the wing tip portion 202. It is to be appreciated that the present disclosure relates to the pin lock mechanism itself. Consequently, the mechanism for raising and lowering the wing tip portion 202 is not shown.

Figure 5:
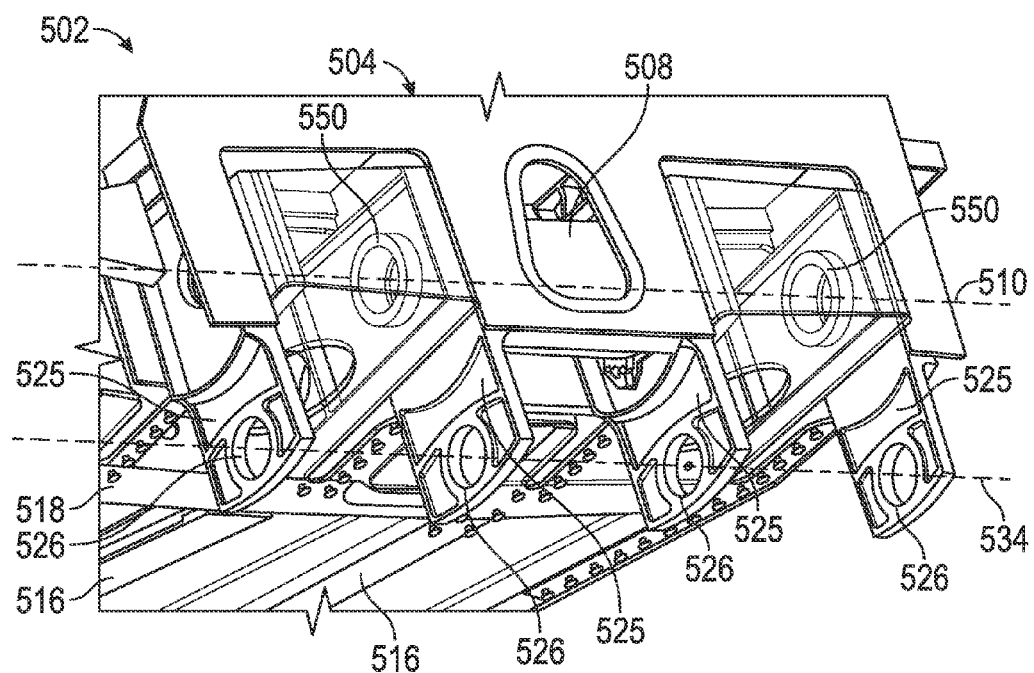
FIG. 5 is a lower perspective view of internal wing structure associated with just the folding wing tip portion of another embodiment of a wing tip locking mechanism.

It is to be appreciated that a variety of other configurations of folding wing mechanisms can be used. Shown in FIG. 5 is a lower perspective view of a portion of the internal structure of another embodiment of a wing tip portion 502 of a folding wing aircraft. This view is looking in an outboard direction at the underside of only the wing tip portion 502 at the hinge connection location, and does not show any of the associated fixed inboard wing portion. The top skin of the wing tip is indicated at 504. Like the other configuration shown in FIGS. 2 and 3, in this embodiment the wing tip portion 502 includes longitudinal wing tip spars 516 and transverse ribs 518. Extending inboard from the wing tip spars are a group of wing tip spar extensions 524, which extend inboard to a hinge location 508, with a group of common hinge pin lug holes 550 extending along a pivoting axis 510.

Figure 6:
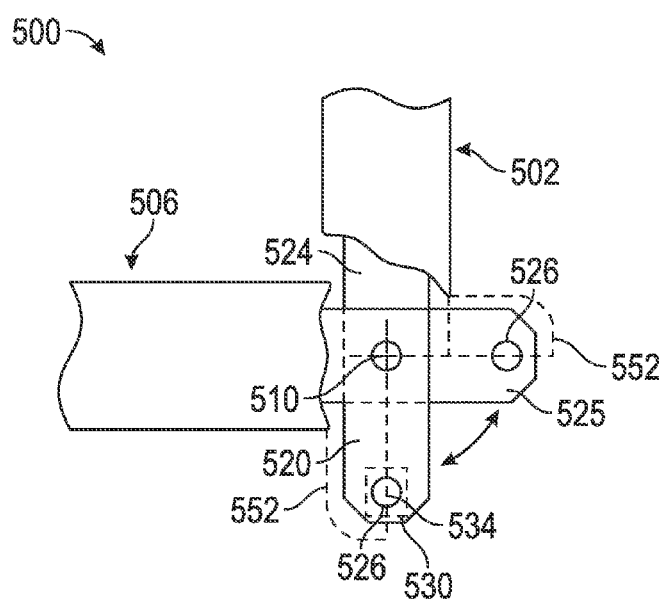
FIG. 6 is a free body diagram of a folding wing tip locking mechanism like that of FIG. 5, showing the relationship of the wing pivoting axis and the pin locking lug holes.

Shown in FIG. 6 is a free body diagram of a folding wing tip locking mechanism 500 configured for a folding wing tip 502 like that of FIG. 5, showing the relationship of the wing pivoting axis 510 and the pin locking lug holes 526 with the wing tip portion 502 in the folded or raised position. Viewing FIGS. 5 and 6 together, extending downward from the wing tip spar extensions 524 at the hinge location are a group of pin locking extension lugs 525. These pin-locking extension lugs 525 each include a pin lock lug hole 526, and are configured for interleaving with main wing pin locking extensions 520 that are attached to the main wing spars (not shown). The pin lock lug holes 526 align along a pin lock axis 534, so as to allow a group of pin locking mechanisms 530 (like those shown in FIGS. 2 and 3) to be used with the configuration of FIGS. 5 and 6. As shown in FIG. 6, the pin locking mechanism 530 is disposed below the hinge axis 510 of the folding wing portion 502, so that the pin locking mechanism 530 (and possibly other structure associated with raising and lowering the wing tip) can be disposed within a pod 552 that extends below the wing.

Shown in FIGS. 7A and 7B are side and top view free body diagrams, respectively, of a pin locking mechanism 700 with the pin locking lug holes 726 aligned. In these views the inboard fixed wing portion 706 and the outboard folding wing tip portion 702 are shown as generic fixed structures to which the extension lugs 720/724 and hinge and pin actuators 730 are attached. The parallel and interleaved relationship of the wing tip lug extensions 724 and the man spar lug extensions 720 is clearly shown in the top view of FIG. 7B. When the wing tip 702 rotates about the pivoting axis 710 until the lug holes 726 align, the wing tip 702 can be locked into place at each pin lock location via the associated pin locking actuator 730 extending the associated pin (not shown) into the lug holes 726 in a sliding fit. When the locking pins 732 are retracted out of the lug holes 726, the wing tip 702 can be raised. The raised position of the wing tip 702 and lowered position of wing tip spar extension 724 are shown in dashed lines at 702a and 724a.

Referring again to FIGS. 2 and 3, the clearance between the locking pins 232 and the pin bushings 228 within the lug holes 226 is tightly controlled, so that the pin within the bushing is very secure. At the same time, the wing tip locking mechanism 200 is designed to be locked and unlocked repeatedly during the life of an aircraft (e.g. before and after every touchdown), and dust accumulation within the pin bushing when the aircraft is on the ground and the wingtips are raised, is a concern. During actuation of the wingtips to the raised position, it is desirable that the pin 232 slide freely in the bushing, and be unimpeded. This freedom of movement can be compromised due to dust accumulation. In one embodiment of this sort of folding wing pin locking mechanism, the pin moves through actuation within about 14 seconds, sliding into the corresponding lug holes 226 with the pin moving at a rate of approximately 1" per second. Hence, it is desirable that hole 226 be clear of dust and debris for the pin to be inserted with minimum force. It is thus desirable to reduce dust and debris that might accumulate on the pins 232 or within the lug holes 226 in order for the pin locking mechanisms 200 to be actuated and to provide a secure wing tip lock and to operate reliably for a long period of time. As noted previously, some systems and methods for the removal of dust from aircraft surfaces present a variety of potentially undesirable characteristics for airplane operation, such as the generation of waste, application of chemicals, redeposition of electrostatically charged dust particles or the charging of uncharged particles and accessibility of the surface to be cleaned.

More generally, electrostatically charged particles will cling to surfaces that have an insufficient electrical conductivity to reduce the electrostatic attraction of the particles. Examples of electrostatic particle/surface interaction can be seen on car dashboards (e.g. a plastic surface) with inorganic and organic particulates. Simple mechanical removal (e.g. brushing/wiping) of particles from the surfaces can be inhibited by the electrical attraction of the particles to the surface. Indeed, brushing may enhance the attraction of the surface to the particles through triboelectric charging, leading to increased surface-to-particle attraction.

Advantageously, as described herein, a system and method for electrostatically cleaning surfaces has been developed that overcomes some of the challenges of prior dust removal devices and methods. While the system and method disclosed herein is shown and described in the context of a releasable pin lock mechanism for a folding aircraft wing, it is believed that this system and method can be used in a variety of applications and industries, such as automotive and aircraft manufacturing, the processing and handling of mineral, food or chemical powder materials, and in the handling of radioactive materials, for example. Any product or operation where the careful and controlled removal of dust is desirable, particularly where dust is to be removed repeatedly or periodically, can potentially benefit from this system and method. More specifically, in applications that are similar to those shown herein, it can be used with a variety of pin locking mechanisms, such as for bank vaults, and the cleaning of elongated pipes and barrels.

Shown in FIGS. 8A-8F are several different embodiments of a pin locking mechanism 800 having an electrostatic cleaning system in accordance with the present disclosure. Identical or similar elements in FIGS. 8A-8F are given identical or similar reference numerals, for ease of reference. It is to be understood that size, shape, spacing, etc. of the various components in FIGS. 8A-8F are not intended to necessarily represent the actual appearance of this sort of device, but are shown in a manner that helps to clearly illustrate the general parts of the system and their operation.

Shown in FIG. 8A is a schematic diagram of one embodiment of an electrostatic cleaning system 850a associated with a releasable pin lock mechanism 800. Three lug extensions 820/822, 824 are shown with aligned lug holes 826. Pin bushings 828 are disposed within these lug holes 826. The pin bushings are typically of a material such as hardened steel. Two of these lug extensions 820/822 can be considered as being affixed to one structure (e.g. the inboard fixed wing portion of an aircraft), while the third lug extension 824 can be considered as being attached to a moveable structure (e.g. a folding wing tip).

A locking pin 832 is shown attached to a pin actuator 830, which is configured to extend the pin along a pin lock axis 834 into the aligned lug holes 826 or retract it from them. The pin 832 is typically of high strength steel, such as 17-4 or 15-5. In the embodiment of FIG. 8A, the pin 832 includes an elongate electrically chargeable brush 852 attached at the distal end 854 of the pin 832. This brush 852 has a form that is similar in configuration to a bottle brush, with a cylindrical array of electrostatically conductive bristles 856 with an outer diameter that is slightly larger than the inner diameter of the lug holes 826. The brush 852 is flexible and fatigue resistant, with bristles 856 that can flex in both directions and be connected to the 'charged' surface during movement of the brush. The bristles have a conductivity that does not cause the voltage source to be directly applied to the structure that is being cleaned.

Those of skill in the art will appreciate that the use of standard metal or polymeric brushes for dust removal can lead to redeposition of the charged particles or the charging of uncharged particles by the brush (tribologic charging). Typical brushes also cannot change the electrostatic state of the particles that are being brushed. In the system disclosed herein, these issues are addressed. Advantageously, the bristles 856 of the elongate brush 852 are of a material that can conduct limited amounts of electricity and transmit an accumulated electrical charge, i.e. a leaky capacitive circuit is established. It is desirable that the electrical conductivity of the brush 852 and bristles 856 be sufficient to allow for charge decay (to a neutral state of charge) in less than about 1 second. It is also desirable that the brush 852 not induce a secondary state of charge (tribologic) on the brushed surface, and that the bristles 856 will not accumulate excessive particles (leading to capacitive insulation) due to attraction from charging of particles or of the brush 852. Examples of suitable materials for the bristles 856 include polymeric filaments of having a conductivity in the range of $10 \times 10^5$ to $10 \times 10^7$ ohm-m are considered suitable. Specific examples of materials that fall into this category include PEEK, Nylon 6-10 and Nylon 6-12. The bristle filaments can have up to 30% carbon black content as a conductive filler. The electrical conductivity of the bristles 856 enables the brush 852 to attract electrostatically charged particles from the pin bushings 828 as the pin 832 is extended into or retracted from the lug holes 826.

The locking pin 832 and the shaft 858 of the brush 852 are electrically conductive (e.g. of metal) and are electrically attached to one pole of a first reversible voltage source 860a. The other pole of the voltage source is grounded. For an aircraft folding wing tip locking mechanism, this voltage source can be associated with the aircraft electrical system, or it can be a separate system, if desired. With the polarity of the first voltage source 860a in one configuration, dust particles will adhere to the bristles 856 of the brush 852 as it moves through the pin bushings 828 in the lug holes 826. After passage of the brush 852 through the pin bushings 828, the first voltage source 860a can be reversed in polarity, and thus the brush 852 can be charged or discharged with application of electricity. The change in polarity can lead to the electrostatic attraction or repulsion of charged particles at will. Thus, repulsion of the attracted particles (those that stick to the bristles 856) can be facilitated by changing the polarity of the bristles 856 leading to selective repulsion of dust particles 862 onto a collection device 864, or generally discharged to the environment outside of the bushing. Multiple collection devices 864 can be provided, such that the brush 852 can be cleaned after each extension and retraction of the pin 832 and the brush 852 through the lug holes 826. To accomplish this, the polarity of the first voltage source 860a is reversed, such as via an automatic controller 866, so that the brush 852 then repels the accumulated dust particles 862 away from the lug or onto a collection device. In this way, the electrostatic brush 852 can be self-cleaning.

Figure 8B:
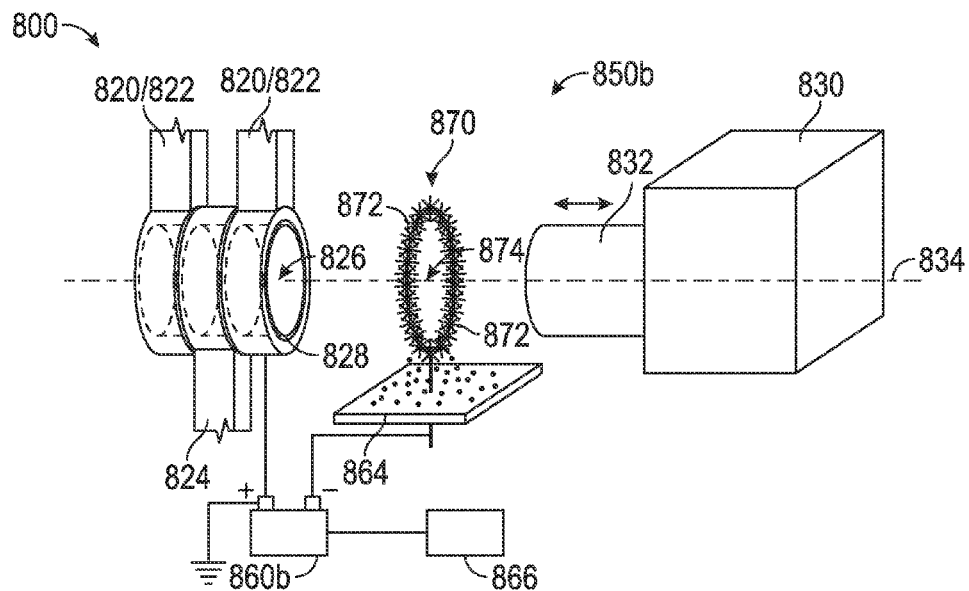
FIG. 8B is a schematic diagram of an embodiment of an electrostatic cleaning system associated with a pin lock mechanism, with an annular electrically chargeable brush disposed adjacent to the pin hole opening.

The principles of operation of the electrostatic cleaning system shown in FIG. 8A can be applied in a variety of configurations. Shown in FIG. 8B is a schematic diagram of another embodiment of an electrostatic cleaning system 850b associated with a pin lock mechanism 800 in accordance with the present disclosure. As with the embodiment of FIG. 8A, three lug extensions 820/822, 824 are shown with aligned lug holes 826. Pin bushings 828 are disposed within these lug holes 826. Two of these lug extensions 820/822 can be considered as being affixed to one structure (e.g. the inboard fixed wing portion of an aircraft), while the third lug extension 824 can be considered as being attached to a moveable structure (e.g. a folding wing tip). A locking pin 832 is shown attached to a pin actuator 830, which is configured to extend the pin along the pin lock axis 834 into the aligned lug holes 826 or retract it from them.

Unlike the embodiment of FIG. 8A, in the embodiment of FIG. 8B a circular or annular electrically chargeable brush 870 is disposed adjacent to and axially aligned with the lug holes 826. This brush 870 has a circular or annular shape, with an annular array of electrostatically conductive bristles 872 that extend toward the center 874 of the circle, the inner diameter of the array of bristles 872 being slightly smaller in diameter than the locking pin 832 and the lug holes 826.

The bristles 872 of the annular brush 870 can have the same physical and electrical properties as described with respect to the brush of FIG. 8A. The flexible bristles will flexibly press against and stay in contact with the outer surface of the pin 832 as it passes through the central opening of the annular brush 870 during extension or retraction of the pin 832. The bristles 872 are of a material as described above, which can conduct limited amounts of electricity and discharge accumulated electrical charge. The electrical conductivity of the brush 870 enables the brush 870 to attract electrostatically charged particles from the pin 832 as it is extended into or retracted from the lug holes 826, and will allow for charge decay (to neutral state of charge) in less than about 1 second, without inducing a secondary state of charge (tribologic) on the brushed surface, or accumulating particles due to attraction from charging of particles or of the brush 870.

The annular brush 870 is electrically attached to one pole of a second reversible voltage source 860b. The other pole is grounded and also attached to one of the extension lugs 820/822. With the polarity of the second voltage source 860b in one configuration, dust particles will adhere to the bristles 872 of the annular brush 870 as the pin 832 moves through the annular brush 870 during extension into or retraction from the lug holes 826. Since the second voltage source 860*b* is reversible in polarity, a change in polarity can lead to the electrostatic attraction or repulsion of charged particles at will. Thus, after passage of the pin 832 through the annular brush 870, repulsion of the attracted particles can be accomplished by changing the polarity of the annular brush 870, leading to selective repulsion of the particles 862 into a collection device 864, in the manner discussed above. After each extension or refraction of the pin 832 through the annular brush 870, the polarity of the second voltage source 860*b* can be reversed (e.g. via an automatic controller) so that the brush 870 then repels the attracted dust particles 862. In this way, the annular brush 870 can be self-cleaning.

Figure 8C:
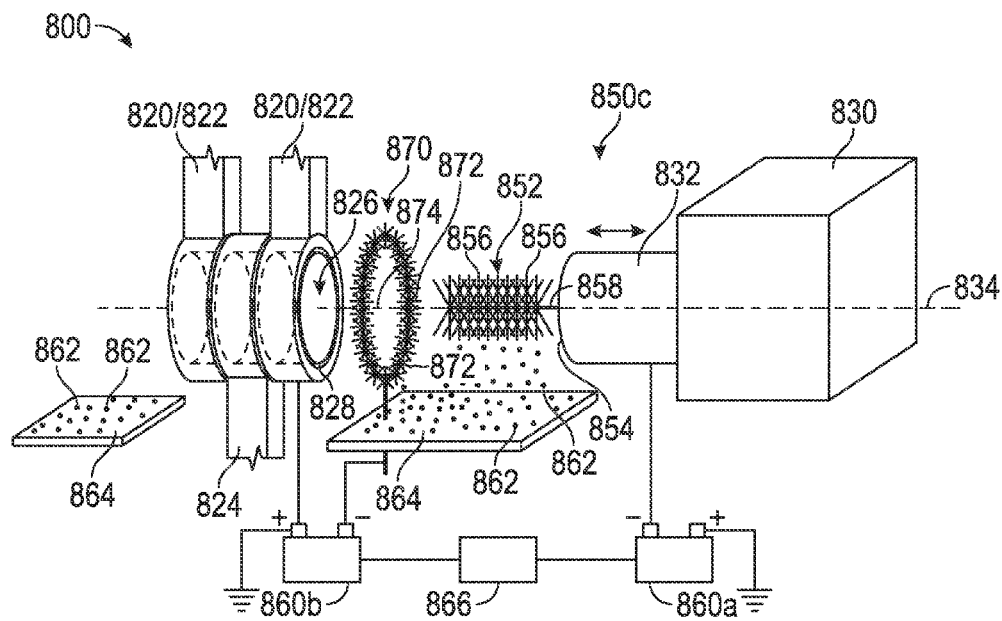
FIG. 8C is a schematic diagram of an embodiment of an electrostatic cleaning system associated with a pin lock mechanism, with both an elongate electrically chargeable brush attached to the distal end of the pin and an annular electrically chargeable brush disposed adjacent to the pin hole opening.

Shown in FIG. 8C is a schematic diagram of another embodiment of an electrostatic cleaning system 850*c* associated with a pin lock mechanism 800 that combines all of the features of FIGS. 8A and 8B. That is, this embodiment includes both an elongate electrically chargeable brush 852 attached to the distal end 854 of the locking pin 832 and an annular electrically chargeable brush 870 disposed adjacent to the lug holes 826. The locking pin 832 and the annular brush 870 are both electrically connected to switchable voltage sources 860*a*, *b*, as described above, so that the locking pin 832 is electrostatically cleaned of dust as it passes through the annular brush 870, and the pin bushings 828 are electrostatically cleaned of dust as the elongate brush 852 passes through them during extension or retraction of the locking pin 832. Following each extension and/or retraction of the pin 832, the polarity of the voltage applied to each brush 852, 870 can be reversed, allowing each brush to release its accumulated particulate load, releasing its retained dust 862 away from the area that was brushed.

Figure 8D:
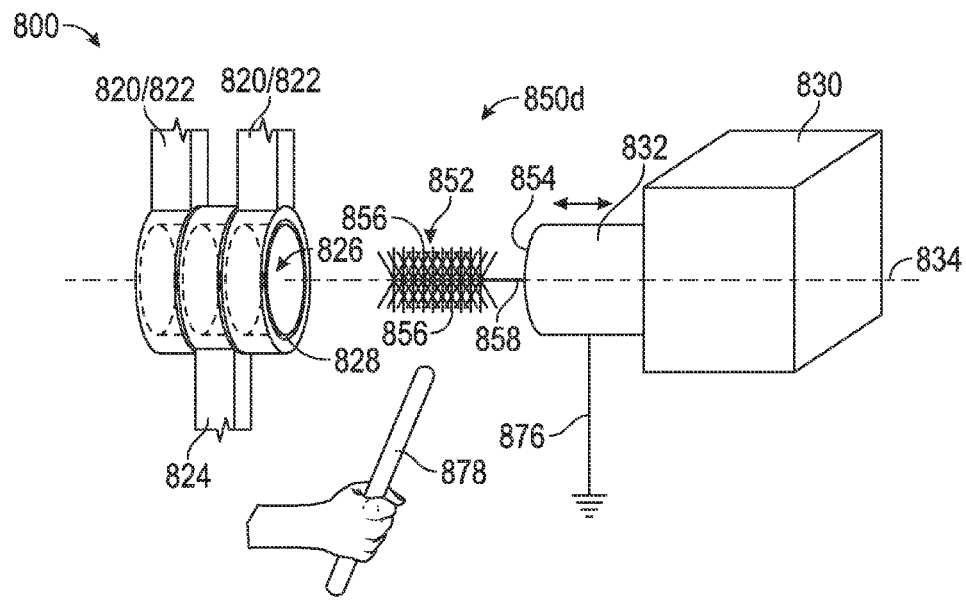
FIG. 8D is a schematic diagram of an embodiment of an electrostatic cleaning system associated with a pin lock mechanism, the pin having an electrostatic brush attached at its distal end that is grounded for continuous discharge and can be mechanically cleaned by maintenance personnel.

While the embodiments of FIGS. 8A-8C are self-cleaning, an electrostatic cleaning system in accordance with the present disclosure can be configured in various other ways. Shown in FIG. 8D is a schematic diagram of a pin lock mechanism 800 having an electrostatic cleaning system 850*d* in which the electrostatic brush 852 is grounded for continuous discharge. This embodiment is similar to FIG. 8A. Three lug extensions 820/822, 824 have aligned lug holes 826, with pin bushings 828 disposed within these lug holes 826. A locking pin 832 is attached to a pin actuator 830, which is configured to extend the pin along the pin lock axis 834 into the aligned lug holes 826 or retract it from them.

The pin 832 includes an elongate bottle brush-type electrostatically chargeable brush 852 attached at its distal end 854. The elongate brush 852 has a cylindrical array of electrostatically conductive bristles 856 with an outer diameter that is slightly larger than the inner diameter of the lug holes 826. The bristles 856 of the brush 852 are flexible and fatigue resistant, and can flex in both directions so as to stay in contact with the inner surface of the pin bushing 828 during movement of the brush 852 through the bushing. The bristles 856 have electrical characteristics like those discussed above, which enables the brush 852 to attract electrostatically charged particles from the pin bushings 828 as the pin 832 is extended into or retracted from the lug holes 826.

Unlike the embodiment of FIG. 8A, in the embodiment of FIG. 8D the locking pin 832 (and hence the electrically conductive shaft 858 of the brush 852) are not connected to a voltage source, but are electrically grounded, as indicated at 876. Grounding is achieved by a circuit formed between the pin and aircraft structure. Since the bristles 856 of the brush 852 are of an electrostatically different material than the pin bushings 828 and are electrically grounded, friction between the bristles 856 of the brush 852 and the surface of the pin bushings 828 will generate an electrostatic charge, which will naturally attract dust particles from the pin bushings 828 to the brush 852. This will lead to the tribologic charging and accumulation of oppositely charged particulates to the brush surface. Dust particles (not shown in FIG. 8C) will adhere to the bristles 856 of the brush 852 through this electrostatic attraction as the brush 852 moves through the pin bushings 828 in the lug holes 826.

Since the brush 852 is not attached to a voltage source, removal of dust particles from the brush 852 can be accomplished by a maintenance worker. In the context of a pin locking mechanism 800 for folding aircraft wings, whenever the aircraft is on the ground and the wing tips are raised, a worker can apply an electrically neutral or electrically charged wand 878 or other similar device to the brush 852. Because of the different polarity between the brush 852 and the wand 878, rubbing the wand 878 or other device against the brush will cause the accumulated dust particles to be attracted to the wand 878 by electrostatic attraction. In this way, the electrostatic brush 852 can be periodically mechanically cleaned by maintenance personnel. Other cleaning methods, such as mechanical vibration of the brush 852, can also be used alone or together with an electrostatic device.

Figure 8E:
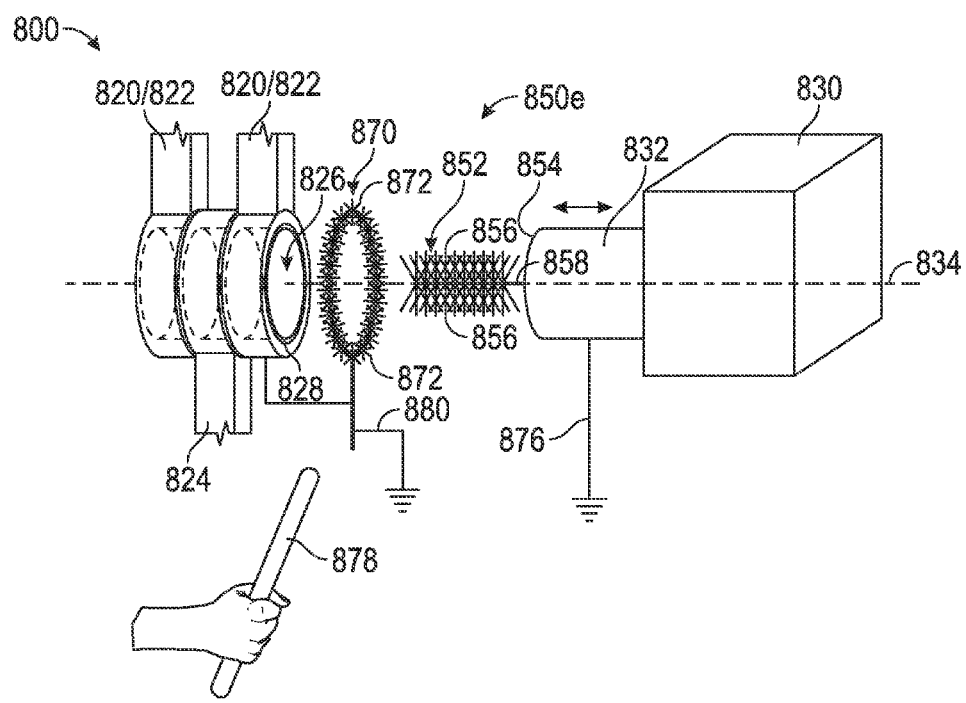
FIG. 8E is a schematic diagram of an embodiment of an electrostatic cleaning system associated with a pin lock mechanism, with an elongate electrostatic brush attached to the distal end of the pin and an annular electrostatic brush disposed adjacent to the pin hole opening, both of which are grounded for continuous discharge and can be mechanically cleaned by maintenance personnel.

Shown in FIG. 8E is a schematic diagram of a pin lock mechanism having an electrostatic cleaning system that includes both an elongate electrically grounded electrostatic brush 852 attached to the distal end 854 of the locking pin 832 and an annular electrically grounded electrostatic brush 870 disposed adjacent to the lug holes 826. Three lug extensions 820/822, 824 have aligned lug holes 826, with pin bushings 828 disposed within these lug holes 826. A locking pin 832 is attached to a pin actuator 830, which is configured to extend the pin along the pin lock axis 834 into the aligned lug holes 826 or retract it from them. This embodiment is similar to that of FIG. 8C, except that the locking pin 832 and the annular brush 870 are both electrically grounded for continuous discharge, so that the locking pin 832 is electrostatically cleaned of dust as it passes through the annular brush 870, and the pin bushings 828 are electrostatically cleaned of dust as the elongate brush 852 passes through them.

The bristles of the brushes 852, 870 can have the same physical and electrical properties as described above. The electrical conductivity of the brushes enables them to attract electrostatically charged particles from the pin 832 and from within the pin bushings 828 as the pin is extended into or retracted from the lug holes 826, and will allow for rapid charge decay, as discussed above, without inducing a secondary state of charge (tribologic) on the brushed surface, or accumulating particles due to attraction from charging of particles or brush.

As with the embodiment of FIG. 8D, removal of dust particles from the elongate brush 852 and the annular brush 870 can be accomplished by a maintenance worker using a charged wand 878, mechanical vibration, or other methods, as discussed above. In the context of a pin locking mechanism 800 for folding aircraft wings, this can be done whenever the aircraft is on the ground and the wing tips are raised. Other cleaning methods can also be used alone or together with an electrostatic device, such as mechanical vibration of the brushes.

It is to be understood that the various embodiments shown in FIGS. 8A-8E provide alternative arrangements for the brushes. Thus, for example, while the embodiment of FIG. 8E includes both an elongate cylindrical brush 852 attached to the locking pin 832 and an annular brush 870 for cleaning the locking pin 832, the system shown in FIG. 8E could be configured with only the annular brush 870, similar to FIG. 8B, or both the elongate brush 852 and the annular brush 870 as shown. Indeed, those of skill in the art will recognize that many combinations of the elements of the embodiments shown herein can be used in various configurations and combinations, all of which are intended to be covered by this disclosure.

Figure 8F:
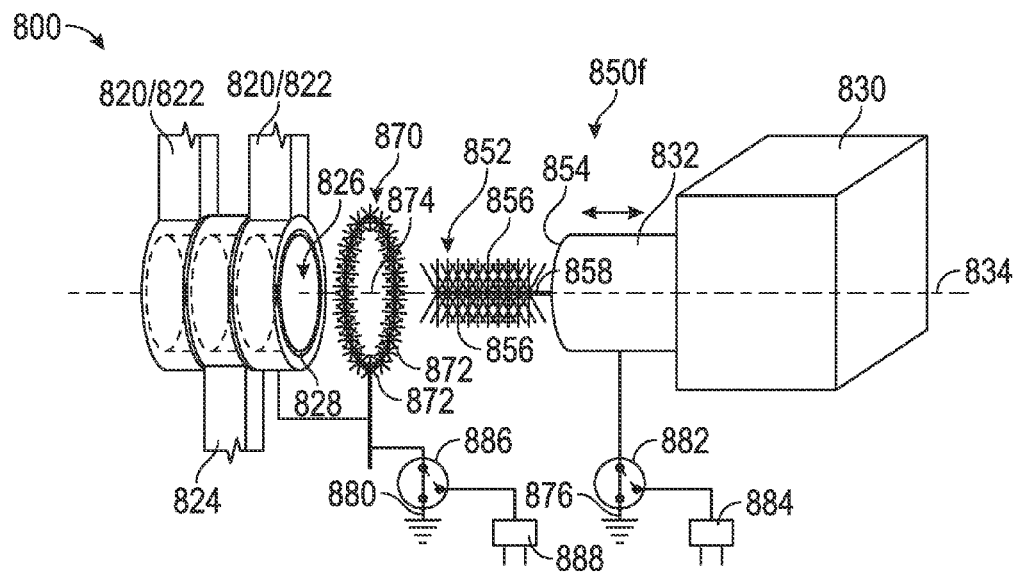
FIG. 8F is a schematic diagram of another embodiment of an electrostatic cleaning system associated with a pin lock mechanism, in which both an elongate electrostatic brush attached to the distal end of the pin and an annular electrostatic brush disposed adjacent to the pin hole opening are grounded for continuous discharge and also include a switch that can electrically connect the brushes to an electrical connection that can be used for electrostatic cleaning of the brushes by maintenance personnel.

Finally, shown in FIG. 8F is a schematic diagram of another embodiment of an electrostatic cleaning system associated with a pin lock mechanism. This figure includes both an elongate electrostatic brush 852 attached to the distal end 854 of the pin 832 and an annular electrostatic brush 870 disposed adjacent to the lug holes 826, both of the brushes being grounded, as shown at 876 and 880, for continuous discharge in the manner discussed above. One of the lug extensions 820/822 is also electrically connected to the annular brush 870 and electrically grounded at 880.

Additionally, each ground connection 876, 880 of the elongate brush 852 and of the annular brush 870 includes a switch 882, 886, which can selectively allow the respective brushes to be electrically connected to an electrical connection socket or plug 884, 888, which can be used for electrostatic cleaning of the brushes by maintenance personnel. That is, with the brushes 852, 870 continually grounded, these brushes can be cleaned by maintenance personnel using an electrically conductive wand (878 in FIG. 8E) or other electrostatic device in the manner discussed above.

Alternatively, however, a maintenance worker can temporarily attach an external voltage source (not shown) to one or both of the electrical connection sockets or plugs 884, 888, and actuate the switches 882, 886, allowing a forced change of polarity of the brushes 852, 870, causing them to repel dust and debris that has been attracted, thus cleaning the brushes of accumulated particles. In the context of a pin lock mechanism 800 for an aircraft folding wing, this procedure can be followed when the aircraft is on the ground and the wing tips are raised. For an aircraft, this embodiment has the advantage that it does not involve onboard voltage sources (860a, 860b in FIGS. 8A-8C) or onboard dust collection devices (864 in FIGS. 8A-8C) that can add weight and cost to the aircraft. If desired, the switches 882, 886 can be directly coupled to the electrical connection sockets or plugs 884, 888, so that the action of mechanically connecting the external voltage source automatically flips the switches 882, 886 to allow the polarity change.

The various embodiments of the system and method for electrostatically cleaning surfaces disclosed herein helps to solve the problem of adherent dust removal for devices and systems where this is desirable. It can be used for pin locking mechanisms, like the folding wing pin locking mechanism shown herein. It can also be used in other applications, such as sliding bank vault bolts or locking pins, and other mechanical devices. This system helps reduce some of the undesirable characteristics of some prior approaches.

Figure 9:
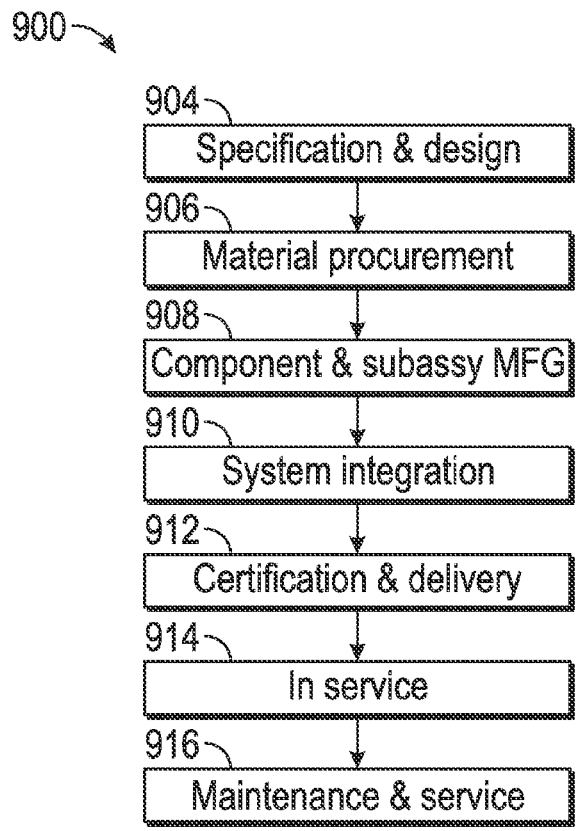
FIG. 9 is a flow diagram of an aircraft production and service methodology.
Figure 10:
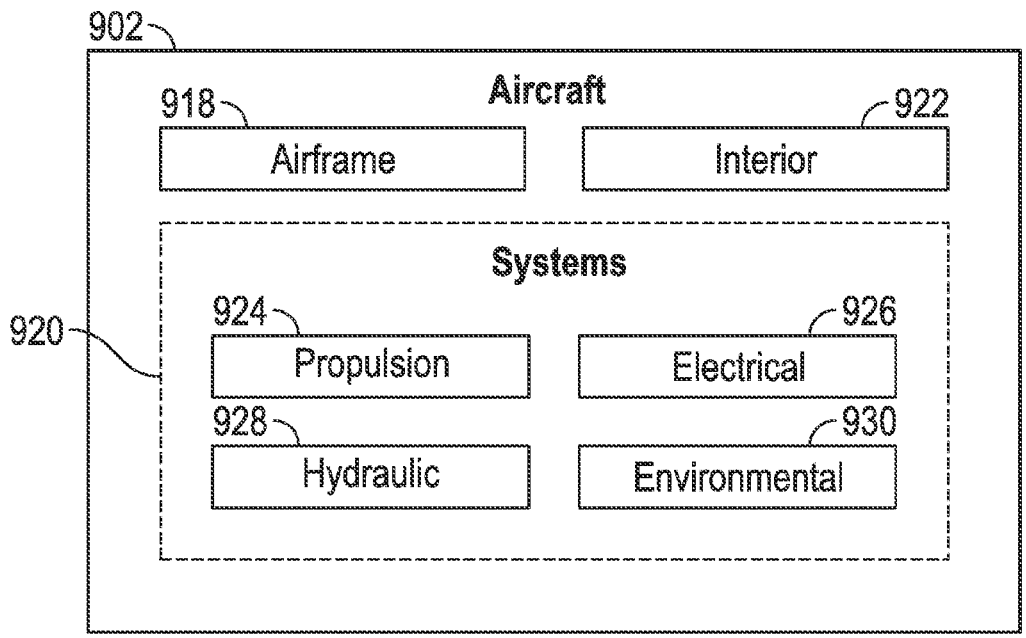
FIG. 10 is a block diagram of an aircraft.

Embodiments of the disclosure may be described in the context of an aircraft manufacturing and service method 900 as shown in FIG. 9, for an aircraft 902 as shown in FIG. 10. During pre-production, exemplary method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, an aerospace vehicle such as an aircraft 902 produced by exemplary method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aircraft is given as an example of an aerospace application for the present disclosure, it is to be understood that this is only one example of an aerospace application. Additionally, while an aerospace example is shown, the principles of the disclosure may be applied to other industries, such as the automotive industry, for example.

Although various embodiments have been shown and described, the present disclosure is not so limited and will be understood to include all such modifications and variations are would be apparent to one skilled in the art.

What is claimed is:

1. A system for electrostatically cleaning surfaces, comprising:
   an electrostatically chargeable brush, having conductive polymer bristles, moveably disposed adjacent to a solid surface to be cleaned;
   an actuator, configured to linearly move a solid element toward and through sliding contact along the solid surface, the brush being positioned to contact at least one of the solid surface and the solid element prior to the sliding contact, to electrostatically remove dust and the like therefrom.

2. A system in accordance with claim 1, wherein the solid element comprises a pin, and the solid surface comprises an inner surface of a receiving lug hole, the receiving lug hole being axially aligned with the pin and adapted to receive the pin in a sliding fit.

3. A system in accordance with claim 2, wherein the electrostatically chargeable brush comprises an elongate, substantially cylindrical brush, having an array of bristles defining an outer periphery larger than a size of the receiving lug hole, the brush being attached to a distal end of the pin, and configured to advance into the receiving lug hole ahead of the distal end.

4. A system in accordance with claim 2, wherein the electrostatically chargeable brush comprises an annular brush, having an array of bristles defining an interior opening smaller than an outer size of the pin, the brush being disposed adjacent to the receiving lug hole, the pin configured to advance through the interior opening prior to entering the receiving lug hole.

5. A system in accordance with claim 1, further comprising a voltage source, coupled to the electrostatically chargeable brush, having a switchable polarity.

6. A system in accordance with claim 5, further comprising a collection device, positioned adjacent to the electrostatically chargeable brush, configured to receive dust and the like that has been electrostatically discharged from the brush by a reversal of polarity from the voltage source.

7. A system in accordance with claim 1, wherein the solid element comprises a locking pin of an aircraft folding wing locking mechanism, and the solid surface comprises an inner surface of a plurality of axially aligned receiving lug holes, each receiving lug hole including a pin bushing, at least a first one of the receiving lug holes being affixed to a folding portion of a wing of the aircraft, and at least a second one of the receiving lug holes being associated with a fixed portion of the wing of the aircraft, the actuator being configured to selectively linearly move the locking pin into the receiving lug holes in a sliding fit.

8. A system in accordance with claim 1, wherein the conductive polymer bristles have a conductivity in the range of $10 \times 10^5$ to $10 \times 10^7$ ohm-m.

9. A system in accordance with claim 1, wherein the conductive polymer bristles include a filler of up to 30% carbon black content.

10. An aircraft having a folding wing, comprising:
an inboard fixed wing portion;
a folding outboard wing tip portion, hingedly connected to the inboard fixed wing portion, moveable between a lowered, locked position, and a raised, unlocked position;
a releasable pin lock mechanism, configured to fix the outboard wing tip portion in the locked position, including a moveable locking pin and a receiving lug hole;
an electrostatically chargeable brush, associated with the pin lock mechanism, configured to electrostatically attract dust and the like from at least one of the locking pin and the receiving lug hole.

11. An aircraft in accordance with claim 10, wherein the electrostatically chargeable brush comprises an elongate, substantially cylindrical brush, having an array of bristles defining an outer periphery larger than a size of the receiving lug hole, the brush being attached to a distal end of the locking pin, and configured to advance into the receiving lug hole ahead of the distal end.

12. An aircraft in accordance with claim 10, wherein the electrostatically chargeable brush comprises an annular brush, having an array of bristles defining an interior opening smaller than an outer size of the locking pin, the brush being disposed adjacent to and the interior opening being axially aligned with the receiving lug hole, the locking pin configured to advance through the interior opening prior to entering the receiving lug hole.

13. An aircraft in accordance with claim 10, further comprising a voltage source, coupled to the electrostatically chargeable brush, having a switchable polarity, reversed polarity applied to the brush causing electrostatic repulsion of the attracted dust and the like.

14. An aircraft in accordance with claim 10, wherein the electrostatically chargeable brush is electrically grounded.

\* \* \* \* \*